United States Patent [19]

Hoffman

[11] Patent Number: 4,807,538

[45] Date of Patent: Feb. 28, 1989

[54] TOY DESK UNIT

[75] Inventor: James D. Hoffman, Grand Haven, Mich.

[73] Assignee: School Zone Publishing Company, Grand Haven, Mich.

[21] Appl. No.: 43,229

[22] Filed: Apr. 23, 1987

[51] Int. Cl.$^4$ ............................................. A47B 85/00
[52] U.S. Cl. ........................................ 108/25; 206/214
[58] Field of Search ...................... 108/38, 26, 25, 50; 206/214, 215, 224, 45.13, 45.18, 45; 312/231, 233; 190/110; D6/406, 420, 422, 425

[56] References Cited

U.S. PATENT DOCUMENTS

| | | |
|---|---|---|
| D. 24,803 | 10/1895 | Linn et al. . |
| 27,403 | 7/1897 | Sherwood ........................... D6/420 |
| D. 30,010 | 1/1899 | Roberts . |
| D. 209,882 | 1/1968 | Andersen . |
| D. 215,943 | 11/1969 | Grainer . |
| D. 235,458 | 6/1975 | Reiling . |
| D. 258,967 | 4/1981 | Rollinson . |
| D. 282,218 | 1/1986 | Catelli . |
| 409,153 | 8/1889 | Kintz . |
| 477,762 | 6/1892 | Larsson . |
| 591,574 | 10/1897 | Smith . |
| 614,722 | 11/1898 | Isaacs . |
| 1,720,682 | 7/1929 | Carter ........................... 206/371 X |
| 2,182,703 | 12/1939 | Rainwater . |
| 2,355,206 | 8/1944 | Davidson, Jr. ................. 206/45 X |
| 2,654,649 | 10/1953 | Pasewalk et al. . |
| 2,826,469 | 3/1958 | Grant ........................... 108/26 X |
| 3,181,483 | 5/1963 | DeVitt et al. . |
| 3,208,409 | 9/1965 | Gale ............................ 108/25 X |
| 3,249,070 | 5/1966 | Day et al. ........................ 108/26 |
| 4,128,285 | 12/1978 | Lore et al. ..................... 312/196 |
| 4,176,743 | 12/1979 | Fitzpatrick .................... 108/25 X |
| 4,313,112 | 1/1982 | Foster . |
| 4,380,293 | 4/1983 | Wilcox et al. ................ 206/214 X |
| 4,406,368 | 9/1983 | Hermes ........................ 206/214 X |
| 4,427,391 | 1/1984 | Berman ......................... 108/26 X |
| 4,591,056 | 5/1986 | Groch ......................... 206/214 X |

FOREIGN PATENT DOCUMENTS

701113 12/1953 United Kingdom ................. 206/46

Primary Examiner—Kenneth J. Dorner
Assistant Examiner—José V. Chen
Attorney, Agent, or Firm—Price, Heneveld, Cooper, DeWitt & Litton

[57] ABSTRACT

A toy desk unit for organizing learning materials and tools in which a top having a plurality of raised retainer means is provided for retaining the materials and tools. Under the top is provided storage means for much of the same. The top is arranged to be removed without upsetting the learning materials and tools. The raised retainer strips and indentations on the top surface of the toy desk are provided to organize the materials and tools. The desk entices the children to use such material and tools and assists and teaches children to properly organize the same.

6 Claims, 5 Drawing Sheets

TOY DESK UNIT

This invention relates to a toy desk unit and more specifically to such a unit which is a learning center for preschoolers, aged 3 to 6.

BACKGROUND OF THE INVENTION

The present day trend is to start the education of children in the early stages several years before elementary schooling. For that purpose, many different tools have been developed for encouraging children to learn and to increase their learning skills Examples of such learning tools are workbooks which include activity pages for tracing, coloring, comparing, classifying, writing and the like. Flash cards have been devised for use by children in the learning process. Audio cassettes have become very popular for auditory discrimination, learning of rhyming words, the learning of beginning and ending sounds and for such skills as counting, etc. Cubic shaped blocks are very popular for teaching concepts such as counting, comparing, matching, etc. In the use of the workbooks, crayons and pencils are utilized for the coloring and tracing and other marking such as matching sounds to a particular picture. Also, children have become accustomed to a number of different learning materials such as sticker pads and various types of cards.

Although the above types of learning tools have and are being developed extensively for the purpose of getting children ready for school, no way has ever been conceived of consolidating and organizing such materials so that they can be used together, efficiently and stored. Generally such materials are kept in separate boxes or in one box which requires the child before use to sort out all the material because of the unorganized way in which the material is stored. This becomes a drudgery to the child and discourages him or her from using such learning materials. Therefore, there has been a long felt need for some way in organizing and keeping such learning materials organized and, in fact, enticing the child to use such learning materials by making it fun.

SUMMARY OF THE INVENTION

The above need for some way to organize learning material, to keep it organized, to entice children to use such material, and to assist in the use of such materials by proper organization, is met by the present invention. Although called a toy, it is in reality a learning center that not only provides a way of organizing a number of learning materials, but also organizes it is such a way that the child wants to use the materials and is assisted in the use of the same.

In accordance with this invention, I provide a desk unit which in silhouette has the same general shape of desk used in elementary schools but includes a unique construction wherein many of the learning tools referred to above are retained on the top working surface in a way that is most conducive for learning by the child. The desk has a top which can be easily removed and laid to one side for obtaining access to the inside of the desk wherein organized compartments are provided for storing pads, cassette tapes, workbooks, flash cards, etc.

The top has a plurality of raised retainer strips which provide compartments for retaining a workbook centrally of the top. Indentations are provided on the top surface in which concept blocks are received for displaying the alphabet or other conceptual learning information. Elongated indentations extending in a direction from front to rear are provided for crayons.

My desk has a unique construction in that it is formed of three parts including a base with upstanding front, rear and sidewalls on which a horizontal part and slanted part of the top are mounted. The horizontal part of the top is a separate element which at the rear edge thereof and the two sides is provided with flanges that fit over the rear wall and two sides of the base. The front edge of the horizontal part includes a lip for receiving a top rear flange of the slanted top part which also has side and front flanges which fit over the edges of the front and sidewalls of the base. A uniquely constructed card holder is provided for removably mountong on the top.

The desk as briefly described above fulfills a need which has existed for some time to encourage children to learn and to assist them in being organized during the learning process. This uniquely constructed desk unit is easily and inexpensively constructed and is easy for a child to use.

Other features and advantages of the invention will become evident from the detailed description of the preferred embodiments as described hereinbelow.

Figure 1:
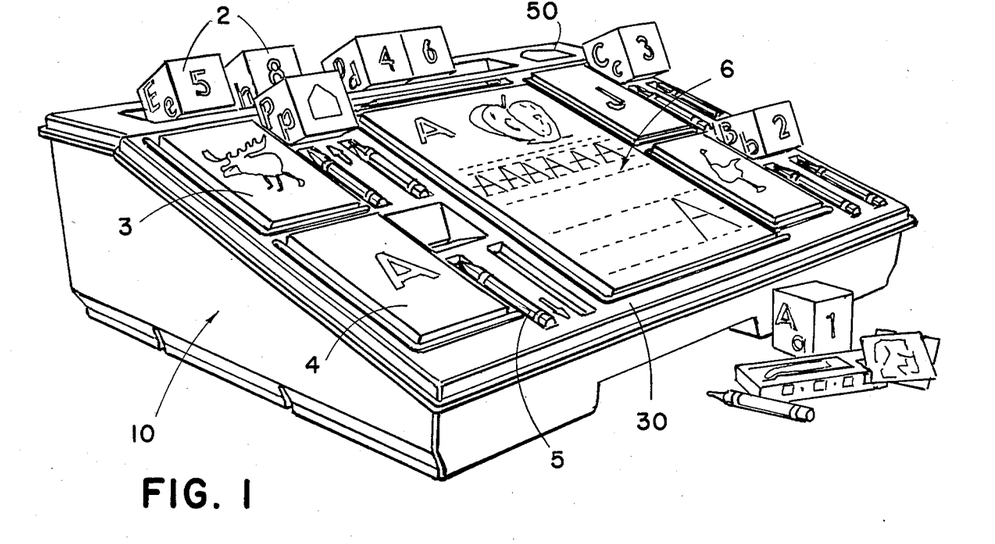
FIG 1 is a perspective view of the desk with the learning materials in place within the compartments and the indentations on the top surface thereof.
Figure 2:
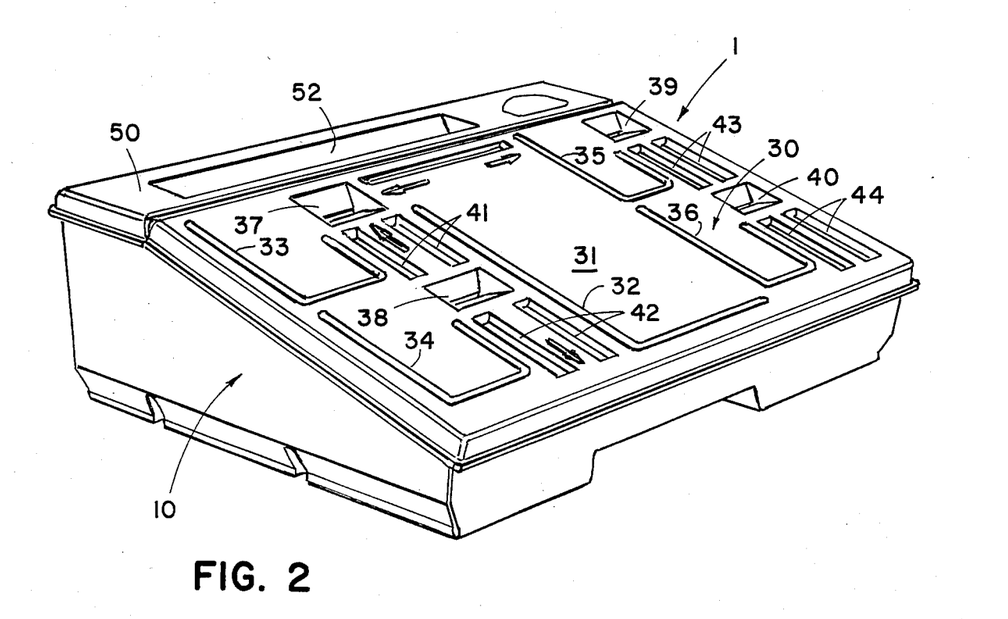
FIG. 2 is the identical perspective view of the desk of this invention without the materials in place.
Figure 3:
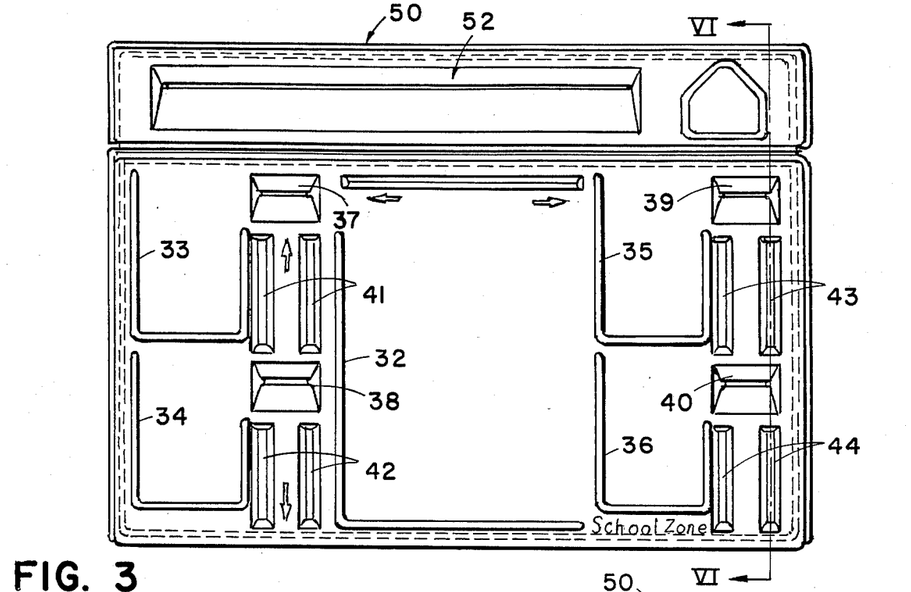
FIG. 3 is a top plan view of the desk of FIG. 2.

Referring to the drawings, particularly FIGS. 1 and 2, reference numeral 1 designates the desk unit of this invention. This desk unit is constructed of three parts, a base 10 and the two parts of the top which comprise the slanted part or portion 30 and the horizontal part or portion 50. As disclosed in FIG. 1, the top has a number of compartments and indentations, as will be described in more detail hereinafter, for receiving and retaining learning materials such as the blocks 2, the picture cards 3, the flash cards 4, the crayons 5, and the workbook or activity pages 6. As disclosed in FIGS. 6 through 10, the base also has a plurality of compartments for storing cassettes 7, flash cards 8, blocks and workbooks.

It will be readily evident from FIG. 1 that these learning materials are organized to be easily stored and used by the child. Further, upon removal of the top, the organization of the materials will not be disturbed because of the compartments and indentations provided.

It should also be evident that the base provides a way of organizing and storing the materials which are easily accessible by lifting the slanted portion 30 off the base 10 and setting it to the side.

For a more detailed illustration of the desk, reference is now made to FIGS. 7, 8, 9, 10, 11 and 12 which disclose the details of the base 10. Referring to these figures, the base is constructed of the front wall 11, the rear wall 12 and the sidewalls 13 and 14, all of which extend downwardly and are formed integrally with the bottom 15. As noted in FIGS. 10, 11 and 12 the walls 13 and 14 are formed with the slanted top edge portions 13a and 14a which merge into the horizontal edge portions 13b and 14b, respectively. The top edges of the side and also of the front and rear walls have a short flange making the base more rigid and also for providing a greater surface on which the top is supported. As disclosed in FIGS. 7–10, the bottom is divided into a number of compartments including compartments 16a and 16b for blocks, 17 for crayons, 18, 19, 24 and 25 for flash cards, paper pads and the like, 20, 21, 22 and 23 for cassettes, and 26 for workbooks.

The base is a one-piece plastic molded construction in which the irregular surfaces forming the indentations for storing the various materials disclosed above are formed.

Figure 13:
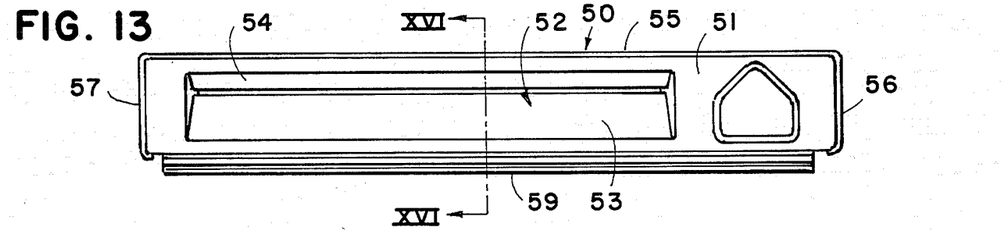
FIG. 13 a plan view of the horizontal portion of the top removed from the base of the desk.
Figure 14:
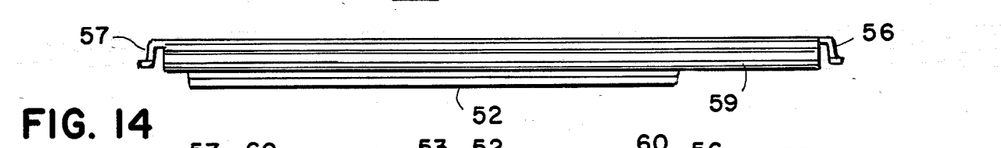
FIG. 14 is a front elevational view of the horizontal portion of the desk.
Figure 15:
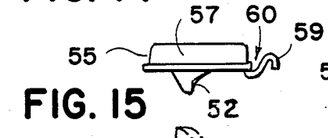
FIG. 15 is one end view of the horizontal portion of the desk.
Figure 16:
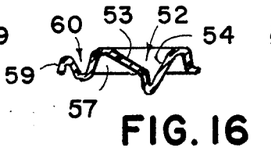
FIG. 16 is a cross-sectional view of the horizontal top portion of the desk taken along the plane XVI—XVI of FIG. 13.
Figure 17:
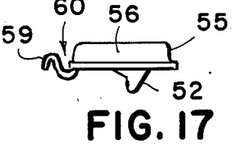
FIG. 17 is an elevational end view of the end opposite the end from that disclosed in FIG. 15.

As previously disclosed, the top of the desk is constructed of two pieces. The construction of the horizontal part 50 is disclosed in FIGS. 13, 14, 15, 16 and 17. As disclosed in those figures, the horizontal top part includes the top surface 51 in which is located a V-shaped recess or indentation 52 having the slanted sides 53 and 54 (FIGS. 13 and 16). The indentation or recess 52 is shaped to receive cubic blocks 2 (FIG. 1) which have six faces with learning indicia such as letters and numbers thereon. These blocks are generally known in the educational field as concept blocks and are used extensively as teaching or learning tools for children. The angles of the walls 53 and 54 are chosen so as to properly display one face of each block located in the recess 52 as disclosed in FIG. 1.

Figure 4:
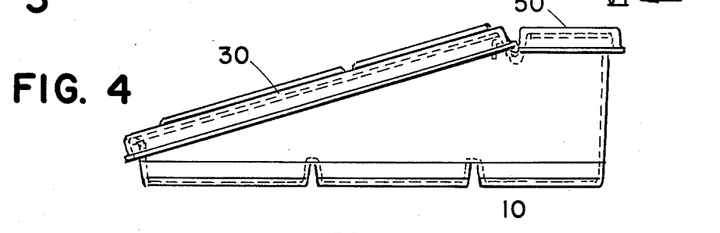
FIG. 4 is a side elevational view of the desk.
Figure 5:
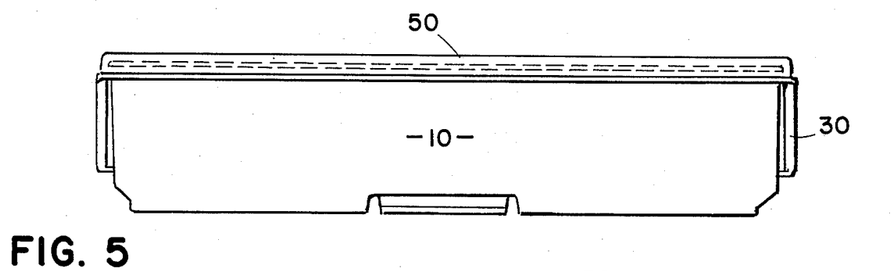
FIG. 5 is a rear elevational view of the desk.
Figure 6:
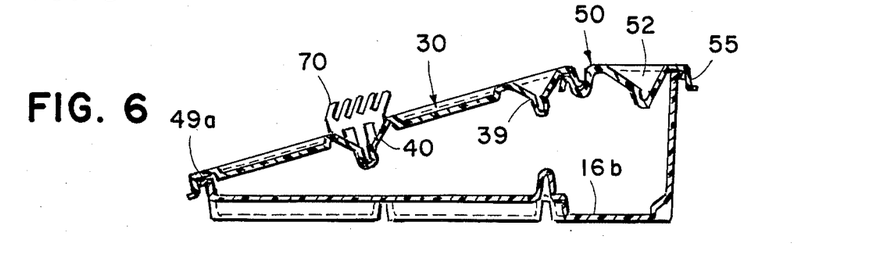
FIG. 6 is a cross-sectional view of the desk taken along the plane VI—VI of FIG. 3.
Figure 7:
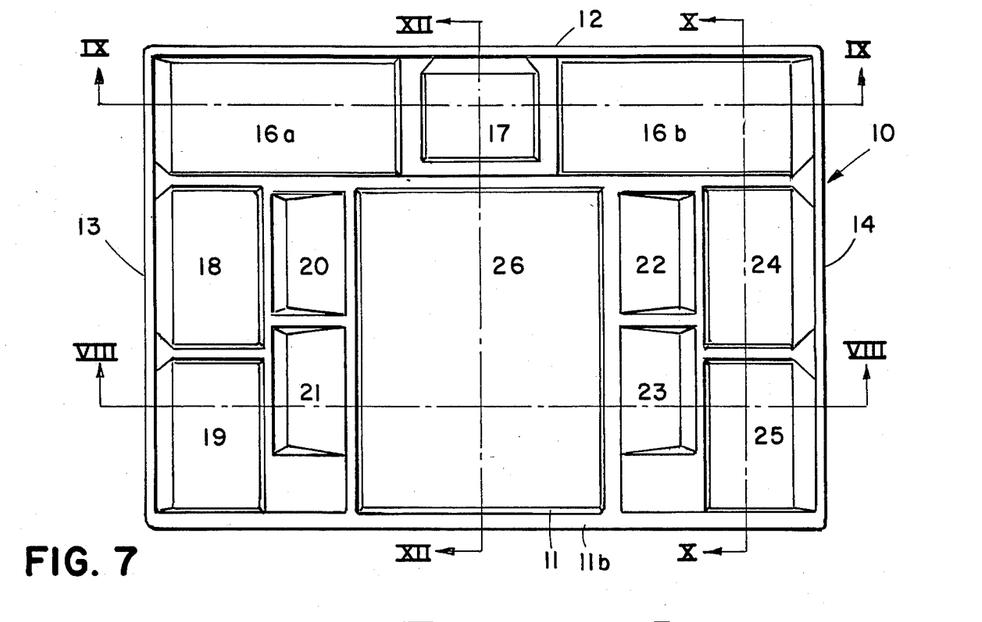
FIG. 7 is a plan view of the base of the desk with the top completely removed.
Figure 8:
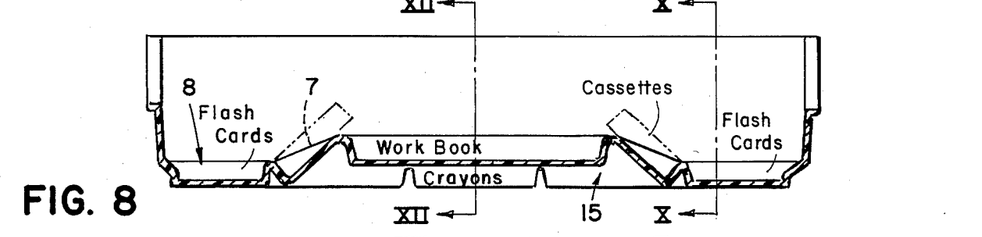
FIG. 8 is a cross-sectional, elevational view of the base taken the plane VIII—VIII of FIG. 7.
Figure 9:
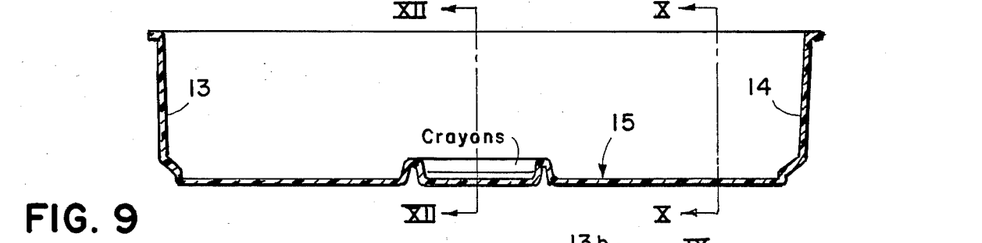
FIG. 9 is an elevational view taken along the plane IX—IX of FIG. 7.
Figure 10:
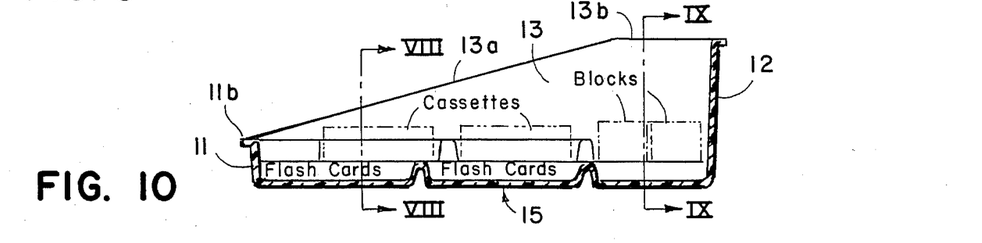
FIG. 10 is a side elevational view taken along the plane X—X of FIG. 7.
Figures 11, 12:
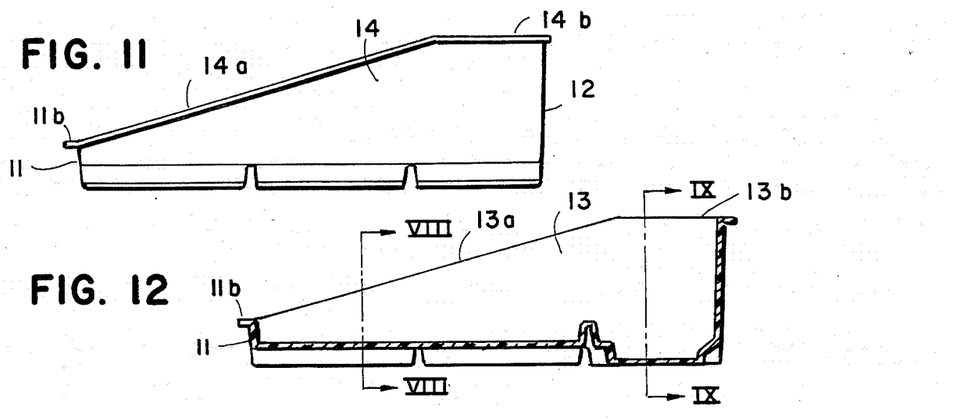
FIG. 11 is a side elevational view of the base.
FIG. 12 is a side elevational view of the base taken along the plane XII—XII of FIG. 7.

The rear and side edges 55, 56 and 57, respectively, include flanges extending downwardly so as to extend over the top edge of the rear wall 12 and over the horizontal edge portions 13b and 14b of the sides 13 and 14, respectively, as disclosed in FIGS. 4, 5 and 6. A lip 59 extends forwardly from the front edge of the horizontal top part. It has a configuration as disclosed in FIGS. 15, 16 and 17 and, therefore, extend downwardly and then upwardly so as to provide a recess or trench 60 which, as disclosed in FIG. 6, receives the top rear edge 49b of the slanted top part as will be described hereinafter.

The horizontal top part 50 is shown as resting on the top edges 14a, 14b, and 12a of the walls of the base 10. It should be understood, however, that fasteners of any number of types could be used for more permanently holding the horizontal top part 50 on the base since it is not absolutely essential that the horizontal top part 50 be removable since the inside of the base 10 is easily accessible upon removing the slanted top part 30.

Reference is now made to FIGS. 20–27 which disclose in more detail the construction and configuration of the slanted top part. As disclosed in these figures, reference numeral 31 denotes a generally flat surface divided into compartments by a number of raised retainer strips 32, 33, 34, 35 and 36. The placement of these retainer strips generally conform to the shape of the flat article which is intended to be retained on the surface 31 by the strips. For example, retainer strip 32, which is located centrally of the top is shaped to retain workbooks or activity pages. Raised retainer strips 33, 34, 35 and 36 define a configuration for retaining picture cards, flash cards, or paper pads, all as disclosed in FIG. 1. The location of these various strips is purposely chosen to assist the child in his or her organization of the various materials that he or she is working with as he or she plays with the materials. The arrangement of the various materials makes is a fun way for the child to learn letters, numbers, colors, shapes and many more pre-reading skills.

In the same vein, the slanted top part includes indentations, depressions or recesses for receiving and retaining concept blocks, crayons, and a pencil. For example, the V-shaped indentations 37, 38, 39 and 40 all receive cubic blocks as disclosed in FIG. 1.

Slanted top part 30 also has the indentations or recesses 41, 42, 43 and 44 for receiving and retaining crayons as disclosed in FIG. 1.

Top parts 30 and 50 are each one-piece plastic molded parts forming the irregular surfaces including the retainer strips and indentations.

Figure 18:
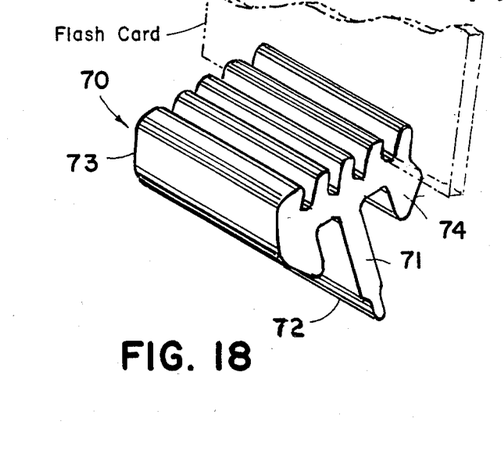
FIG. 18 is a perspective view of a card holder forming one aspect of this invention.

Within a narrower aspect of this invention, I also provide a card holder 70 (FIGS. 18 and 19) which is received and supported within any of the block recesses 37, 38, 39 and 40. FIG. 6 discloses the card holder 70 supported in the recess 40. As disclosed in FIGS. 6, 26 and 27 and also in FIG. 19, each of the V-shaped indentations or recesses include a slot at the apex of the walls. This is disclosed in greater detail in FIG. 19 in which the walls 45 and 46 terminate in the slot 47 or support opening which receives the very reduced end 72 of the support post 71. The card holder 70 also has the support flanges 73 and 74 which engage the walls 45 and 46, respectively. The extreme reduced end 72 and the flanges 73 and 74 extend the entire width of the card holder which has a width substantially the same as the recess or indentation 40. It should be understood that only one of the indentations for the blocks is described, the others have identical configurations and construction.

Figure 19:
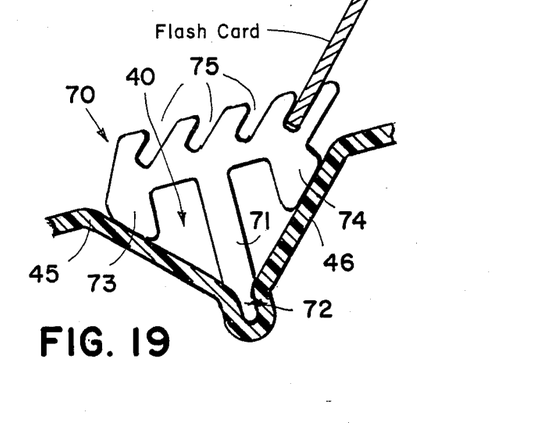
FIG. 19 is a side elevational view of the card holder of FIG. 18 mounted in one of the recesses for a block.
Figure 20:
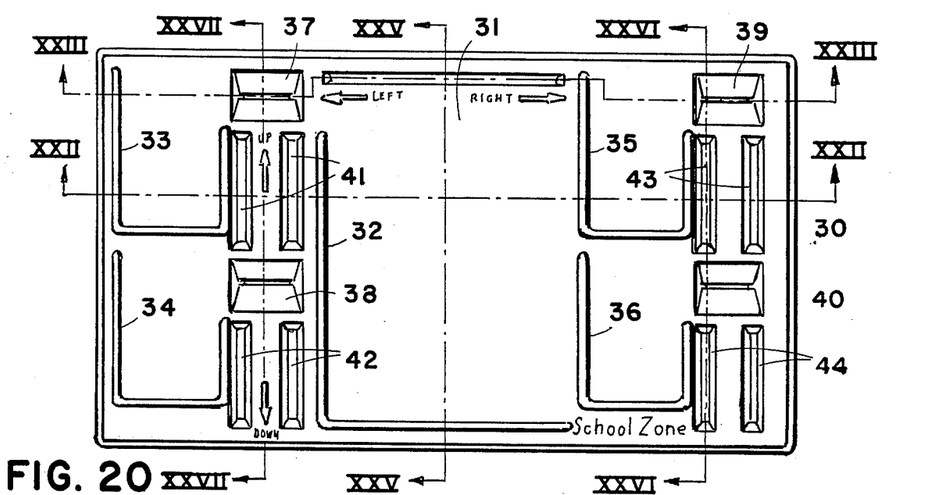
FIG. 20 is a plan view of the slanted top portion of the desk removed from the base.
Figure 21:
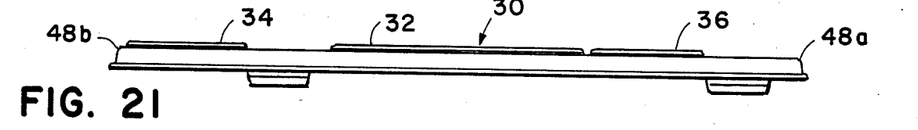
FIG. 21 is a front elevational view of the slanted top portion as disclosed in FIG. 20.
Figure 22:
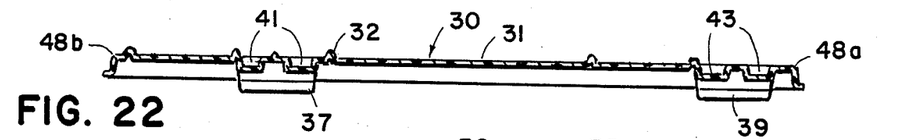
FIG. 22 is an elevational, cross-sectional view taken along the plane XXII—XXII of FIG. 20.
Figure 23:
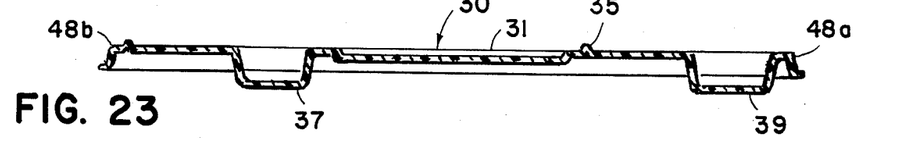
FIG. 23 is an elevational, cross-sectional view taken along the plane XXIII—XXIII of FIG. 20.
Figure 24:
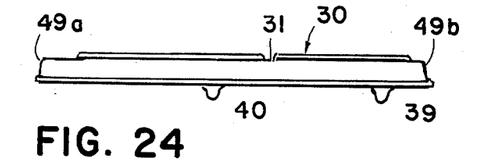
FIG. 24 is a side elevational view of the slanted top position of the desk as disclosed in FIG. 20.
Figure 25:
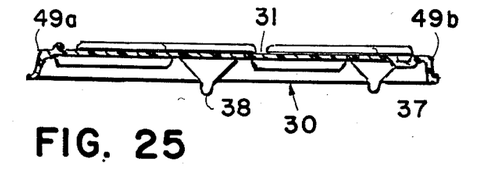
FIG. 25 an elevational, cross-sectional view taken along the plane XXV—XXV of FIG. 20.
Figure 26:
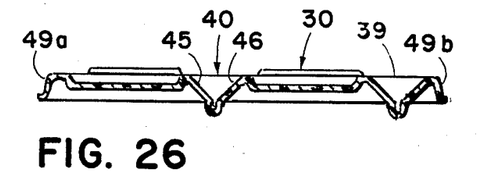
FIG. 26 is an elevational, cross-sectional view taken along plane XXVI—XXVI of FIG. 20.
Figure 27:
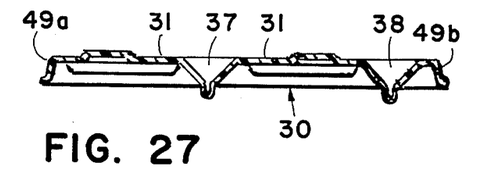
FIG. 27 an elevational, cross-sectional view taken along the plane XXVII—XXVII of FIG. 20.

As disclosed in FIGS. 19 and 20, a plurality of slots 75 are formed in the top of the body of the holder in which cards can be held as a learning aid to the child.

Reference is now made again to FIGS. 3, 4, 5 and 6 which disclose the three parts of the desk assembled. It will be noted as previously described, the flanged edges 55, 56 and 57 of the horizontal top part 50 rest on the edges 12a, 13b and 14b of the sides 12, 13 and 14. The slanted top 30 is then mounted on the base with the flanged edges 48a, 48b, 49a and 49b extending over the edges 13a, 13b and 11b of the base and on the lip 59 of the horizontal top art 50. Having assembled the tops on the base, the various articles such as the blocks, picture cards, flash cards, crayons and workbook can then be placed in position within their specific compartments provided for them. Further, additional blocks, picture cards, flash cards, cassettes, crayons and the like can be stored on the base inside the desk. The top can be easily removed and laid to one side for obtaining access to the inside of the desk to obtain access to such stored articles. In so removing the slanted top, all of the articles are retained in place by reason of the construction as above described.

It will be readily evident from the above description that the learning materials are organized to be used to the best advantage of the child using them. Sufficient storage is provided for extra materials which can be easily accessed by removal of the slanted top part 30. Therefore, in accordance with this invention, the long felt need for some way in organizing and keeping the learning materials for the child in organized fashion and thus enticing the child to use such learning materials and having fun in the use of the same.

Although I have described a preferred embodiment of my invention, it should be understood that several other different embodiments and modifications can be made without departing from the real spirit of this invention. Therefore, this invention should be limited only as set forth in the following appended claims.

The embodiments of the invention in which an exclusive property or privilege is claimed are defined as follows:

1. A toy desk for pre-school children comprising a housing having a base formed of upstanding front, rear and sidewalls, and a bottom; a top supported on said walls of said base; said walls, bottom and top defining a housing having a storage space; said walls being dimensioned to slant at least a portion of said top upwardly from said front wall toward said rear wall, the improvement comprising:
    said top having a surface located generally on a plane with retention means extending from said plane to provide as plurality of compartments of a size and shape to receive and retain differently sized flat articles, said retention means extending from said plane at a distance sufficient to prevent said flat articles from sliding off said slanted top;
    said top including two portions comprising a horizontal top portion located adjacent the rear wall and a slanted top portion slanted upwardly from said front wall to said horizontal top portion;
    said horizontal top portion including a rear side, a front side and two spaced sides extending therebetween, said rear side being supporting on said rear wall and said spaced sides mounted on said side walls; and a lip extending from said front side; said slanted top portion including a rear upper side, a front lower side and two spaced sides extending therebetween; said rear upper side extending over and supported on said lip.

2. The toy desk of claim 1 in which the said retention means includes workbook retention means for retaining said workbook and card retention means for retaining said cards, each of said workbook and card retention means including means extending in a direction between the front and rear walls and means extending in a direction between said sidewalls, said workbook retention means forming a compartment of said sidewalls and said card retention means forming compartments located between said centrally located compartment and said sidewalls.

3. The toy desk of claim I in which the front side and the two spaced sides of said slanted top include flanges fitted on and extending over said front and sidewalls of said base.

4. A toy desk for pre-school children comprising a housing having a base formed of upstanding front, rear and side walls, and a bottom; a top supported on said walls of said base; said walls, bottom and top defining a housing having a storage space; said walls being dimensioned to slant at least a portion of said top upwardly from said front wall toward said rear wall, the improvement comprising:
    said top having a surface located generally on a plane with retention means extending from said plane to provide a plurality of compartments of a size and shape to receive and retain differently sized flat articles, said retention means extendingly from said plane a distance sufficient to prevent said flat articles from sliding off said slanted top; said surface including an indentation of V-shaped configuration formed by two walls converging to an apex for receiving cubic shaped concept blocks having V-shaped corners received in said indentations whereby said blocks are retained in said indentations;
    the apex of said V-shaped indentation including a support opening; a card holder having card holder means supported on an upstanding support means configured at its lower end to be received in said support opening; and flanges mounted on opposite sides of said support means and engaging opposite walls of said V-shaped indentation.

5. The toy desk of claim 4 in which the said flanges have slanted surfaces each located on the same plane as the wall it engages of said V-shaped indentation.

6. A toy desk for pre-school children comprising a housing having a base formed of upstanding front, rear and side walls, and a bottom; a top supported on said walls of said base; said walls, bottom and top defining a housing having a storage space; said walls being dimensioned to slant at least apportion of said top upwardly from said front wall toward said rear wall, the improvement comprising:
    said top having a surface located generally on a plane with retention means extending from said plane to provide a plurality of compartments of a size and shape to receive and retain differently sized flat articles, said retention means extending from said plane a distance sufficient to prevent said flat articles from sliding off said slanted top; said top including two portions comprising a horizontal top portion located adjacent the rear wall and a slanted top portion slanted upwardly from said front wall to said horizontal top portion said horizontal to portion including a rear side, a front side and two spaced sides extending therebetween, said rear side being supported on said rear wall and said spaced sides mounted on said side walls; and a lip extending from said front side; said slanted top portion including a rear upper side, a front lower side and two spaced sides extending therebetween; said rear upper side extending over and supported on said lip; said front side and two spaced sides of said slanted top including flanges fitted on and extending downwardly over said front and sidewalls, respectively, of said base; said rear side and two spaced sides of said horizontal top including flanges fitted on and extending downwardly over said rear and sidewalls, respectively, of said base.

* * * * *

UNITED STATES PATENT AND TRADEMARK OFFICE
CERTIFICATE OF CORRECTION

PATENT NO. : 4,807,538

DATED : February 28, 1989

INVENTOR(S) : James D. Hoffman

It is certified that error appears in the above-identified patent and that said Letters Patent is hereby corrected as shown below:

Column 5, claim 1, line 57;
    "as" should be --a--;

Column 6, claim 4, line 34;
    "extendingly" should be -- extending--;

Column 6, claim 6, line 58;
    "apportion" should be --a portion--;

Column 7, claim 6, line 3;
    "to" should be --top--;

Column 7, line 3, after "portion" insert --;--.

Signed and Sealed this

Twenty-fourth Day of July, 1990

*Attest:*

HARRY F. MANBECK, JR.

*Attesting Officer*      *Commissioner of Patents and Trademarks*